(12) United States Patent
Yanagiya et al.

(10) Patent No.: US 11,313,337 B2
(45) Date of Patent: Apr. 26, 2022

(54) PULSATION DAMPER

(71) Applicant: FUJIKOKI CORPORATION, Tokyo (JP)

(72) Inventors: Hideyuki Yanagiya, Tokyo (JP); Shin Yoshida, Tokyo (JP); Makoto Sudo, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 17/275,920

(22) PCT Filed: Aug. 8, 2019

(86) PCT No.: PCT/JP2019/031415
§ 371 (c)(1),
(2) Date: Mar. 12, 2021

(87) PCT Pub. No.: WO2020/059356
PCT Pub. Date: Mar. 26, 2020

(65) Prior Publication Data
US 2021/0262425 A1    Aug. 26, 2021

(30) Foreign Application Priority Data
Sep. 20, 2018    (JP) .............................. JP2018-175860

(51) Int. Cl.
*F02M 55/04*    (2006.01)
*F02M 59/44*    (2006.01)

(52) U.S. Cl.
CPC ............ *F02M 55/04* (2013.01); *F02M 59/44* (2013.01)

(58) Field of Classification Search
CPC .............................. F02M 55/04; F02M 59/44
See application file for complete search history.

(56) References Cited

U.S. PATENT DOCUMENTS

| | | | |
|---|---|---|---|
| 8,662,868 B2 * | 3/2014 | Oikawa | F04B 37/12 417/540 |
| 9,109,593 B2 * | 8/2015 | Oikawa | F04B 11/0016 |
| 10,378,524 B2 * | 8/2019 | Saito | F02M 59/44 |

(Continued)

FOREIGN PATENT DOCUMENTS

| JP | 08261083 A | * 10/1996 |
|---|---|---|
| JP | 2010007693 A | * 1/2010 |

(Continued)

OTHER PUBLICATIONS

PCT, International Search Report for the corresponding application No. PCT/JP2019/031415, dated Oct. 15, 2019, with English translation.

(Continued)

*Primary Examiner* — Sizo B Vilakazi
*Assistant Examiner* — Brian R Kirby
(74) *Attorney, Agent, or Firm* — Lucas & Mercanti, LLP

(57) ABSTRACT

A pulsation damper is small in size and can achieve an appropriate supporting force for a diaphragm damper. A pulsation damper accommodated in a case includes a diaphragm damper having a gas sealed therein, and a first support member and a second support member that are disposed between the case and the diaphragm damper and that hold the diaphragm damper.

14 Claims, 7 Drawing Sheets

(56) References Cited

U.S. PATENT DOCUMENTS

| | | | | |
|---|---|---|---|---|
| 2003/0164161 A1* | 9/2003 | Usui | ................. | F02M 63/0225 |
| | | | | 417/540 |
| 2009/0127356 A1* | 5/2009 | Junger | ................ | F02M 47/027 |
| | | | | 138/30 |
| 2010/0209274 A1* | 8/2010 | Oikawa | .................. | F04B 37/12 |
| | | | | 417/540 |
| 2010/0215529 A1* | 8/2010 | Inoue | ..................... | F04B 37/12 |
| | | | | 417/540 |
| 2013/0052064 A1 | 2/2013 | Oikawa et al. | | |
| 2015/0260133 A1* | 9/2015 | Iwa | ....................... | F02M 55/04 |
| | | | | 92/47 |
| 2017/0335810 A1* | 11/2017 | Tomitsuka | ......... | F02M 37/0041 |
| 2018/0195478 A1 | 7/2018 | Iwa et al. | | |
| 2018/0209389 A1* | 7/2018 | Iwa | .................... | F04B 11/0016 |
| 2018/0306368 A1* | 10/2018 | Yoshida | ................ | F02M 59/44 |
| 2019/0152455 A1* | 5/2019 | Kai | ...................... | B60T 17/221 |

FOREIGN PATENT DOCUMENTS

| | | | |
|---|---|---|---|
| JP | 2010-223214 A | 10/2010 | |
| JP | 2013-060944 A | 4/2013 | |
| JP | 2014-240658 A | 12/2014 | |
| JP | 5664604 B2 | 2/2015 | |
| JP | 2015-232283 A | 12/2015 | |
| JP | 2015232283 A | * 12/2015 | |
| JP | 2018-071443 A | 5/2018 | |
| WO | 2017/022605 A1 | 2/2017 | |

OTHER PUBLICATIONS

PCT, Written Opinion of the International Searching Authority for the corresponding application No. PCT/JP2019/031415, dated Oct. 15, 2019 (in Japanese language only).

PCT, English translation of Written Opinion of the International Searching Authority for the corresponding application No. PCT/JP2019/031415, dated Oct. 15, 2019.

JPO, Office Action for the related Japanese patent application No. 2018-175846, dated Jan. 18, 2022, with English translation.

* cited by examiner

PULSATION DAMPER

CROSS REFERENCE TO RELATED APPLICATION

This Application is a 371 of PCT/JP2019/031415 filed on Aug. 8, 2019 which, in turn, claimed the priority of Japanese Patent Application No. 2018-175860 filed on Sep. 20, 2018, both applications are incorporated herein by reference.

TECHNICAL FIELD

The present invention relates to a pulsation damper, and specifically, relates to a pulsation damper that is capable of reducing pulsation occurring in a fuel pump.

BACKGROUND ART

Hitherto, a high-pressure fuel pump includes a pulsation damper that absorbs and reduces pulsation of fluid sucked into a pressurizing chamber from a suction passage via a diaphragm damper provided in a fuel chamber being communicated with the pressurizing chamber in a housing body (refer, for example, to Patent Literature 1).

Recently in vehicles, there are rising demands for reduction of fuel consumption and expansion of interior space of vehicles, so that reduction of weight and size of internal combustion engines is promoted, along with which downsizing of fuel pumps is required. If the fuel chamber is downsized in response to the reduction of size of the fuel pump, mounting of a pulsation damper in the interior of the fuel chamber may pose a problem.

CITATION LIST

Patent Literature

[PTL 1] Specification of Japanese Patent No. 5664604

SUMMARY OF INVENTION

Technical Problem

In the pulsation damper disclosed in Patent Literature 1, four claw parts rise radially outward from a support member made of a metal plate that supports a diaphragm, and tips of such claw parts are pressed against a ceiling of the fuel chamber and elastically deformed, the elastic force of the claw parts being used to support the diaphragm. According to this configuration, the diameter of the support member must necessarily be reduced if the fuel chamber is to be simply downsized, but the length of the claw parts will be shortened in the attempt, so that sufficient elastic force cannot be achieved.

In consideration of the problems mentioned above, the present invention aims at providing a pulsation damper that has a small size and that enables to achieve an appropriate supporting force for the diaphragm damper.

Solution to Problem

In order to solve the problems described above, a pulsation damper according to the present invention relates to a pulsation damper accommodated in a case, the pulsation damper including:

a diaphragm damper having a gas sealed therein; and
a support member that is disposed between the case and the diaphragm damper and that holds the diaphragm damper,
wherein the support member includes an annular holding part that is provided on a peripheral edge portion thereof and that holds a peripheral edge of the diaphragm damper, a base part provided on a center part thereof, a plurality of elastically deformable beam parts that are defined by a plurality of opening portions formed in an annularly aligned manner around the base part between the holding part and the base part, each of the plurality of beam parts held by the holding part at one end and held by the base part at the other end, and a plurality of claw parts that abut on the case in an elastically deformable manner, each of the plurality of claw parts provided to extend outward from the base part between two adjacent beam parts.

Advantageous Effects of Invention

The present invention enables to provide a pulsation damper that is small in size and ensures an appropriate supporting force for the diaphragm damper.

DESCRIPTION OF EMBODIMENTS

First Embodiment

Figure 1:
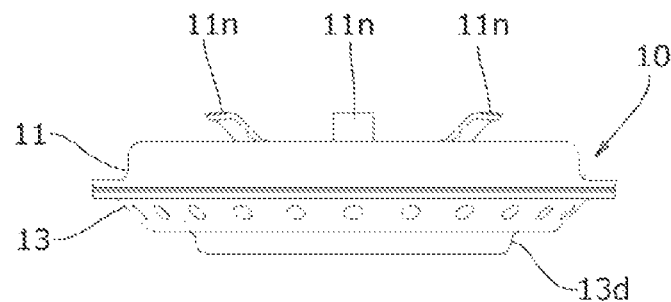
FIG. 1 is a side view of a pulsation damper 10 according to a first embodiment of the present invention.
Figure 2:
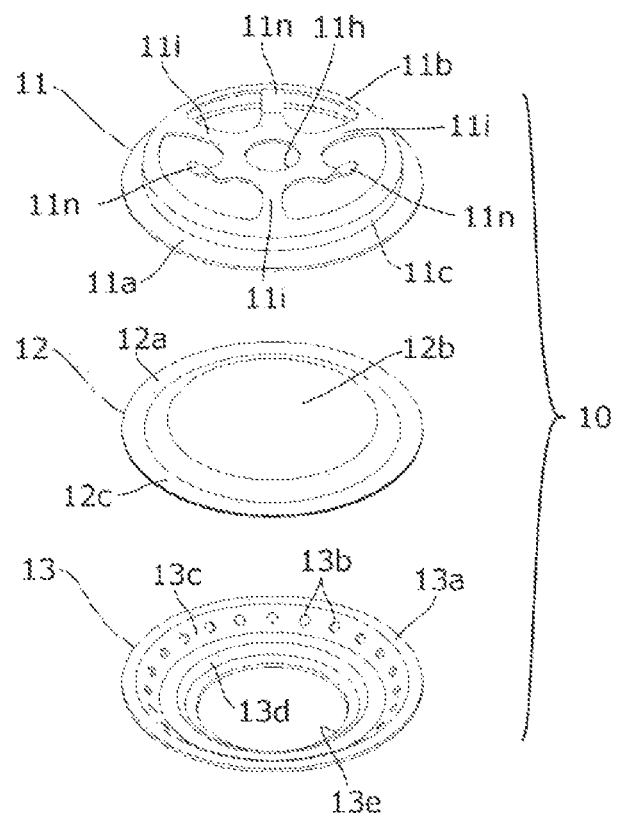
FIG. 2 is an exploded view of the pulsation damper 10.

FIG. 1 is a side view of a pulsation damper 10 according to a first embodiment of the present invention. FIG. 2 is an exploded view of the pulsation damper 10.

As illustrated in the drawings, the pulsation damper 10 is composed of a first support member 11, a diaphragm damper 12 and a second support member 13. The diaphragm damper 12 is composed of two plate members 12a in the present embodiment (only one of which is illustrated in FIG. 2). The plate members 12a having a same circular shape are formed by press-working a stainless-steel plate, and each plate member 12a includes a circular projected part 12b formed at a center and a flange part 12c formed at an outer circumference thereof. The diaphragm damper 12 is formed by disposing the plate members 12a to oppose to one another, joining the flange parts 12c abutted on one another by welding, and sealing gas therein.

The second support member 13 that is formed in a circular shape by press-working a sheet metal includes an annular flange part 13a supporting the diaphragm damper 12, a tapered intermediate part 13c having small openings 13b that are arranged at equal distances in the circumferential direction, and a short cylindrical part 13d connected to the tapered intermediate part 13c. An opening portion 13e is formed at a lower peripheral edge of the short cylindrical part 13d.

FIG. 3(a) is a top view of the first support member 11, and FIG. 3(b) is a side view of the first support member 11.

The first support member 11 formed in a circular shape by press-working a sheet metal includes an annular flange part 11a, an annular center part 11b that is shifted from the flange part 11a, and a cylindrical part 11c that connects the flange part 11a and the center part 11b. The center part 11b and the cylindrical part 11c constitute a holding part that supports the diaphragm damper 12.

The center part 11b includes an annular part 11e connected to the cylindrical part 11c and a Y-shaped bridge part 11f connected to the annular part 11e. A base part 11g having an approximately hexagonal shape is provided at a center of the bridge part 11f, and a circular opening portion 11h is formed at a center of the base part 11g. The bridge part 11f is composed of three beam parts 11i connected radially to the base part 11g. Further, three approximately fan-shaped openings 11j are formed in a manner each surrounded by the annular part 11e and two adjacent beam parts 11i of the bridge part 11f.

Each beam part 11i is defined by the opening portions 11j formed in an annularly aligned manner around the base part 11g among the center part 11b, the cylindrical part 11c and the base part 11g, that is capable of deforming elastically, that has one end held by the center part 11b and the cylindrical part 11c and the other end held by the base part 11g.

The respective beam parts 11i have the same shape, and each beam part 11i forms a neck 11k where a width of the beam part 11i is narrowed smoothly toward a center thereof. When a load is applied to a pulsation damper 10 during assembly, the respective beam parts 11i will be easily bended by providing the neck 11k at the center of each beam part 11i. Further, the elastic modulus of the bridge part 11f can be adjusted easily by changing the shape of the respective necks 11k.

In the opening 11j, three claw parts 11n are formed to rise radially outward from the base part 11g respectively at intermediate positions between two adjacent beam parts 11i. Each claw part 11n includes a rising part 11o that is bent so as to rise from the base part 11g at a bend line 11m serving as border, and an abutment part 11q having an approximately trapezoidal shape and connected to the rising part 11o via a bend line 11p serving as border. The respective abutment parts 11q constitute a part of a cylindrical surface in this example, but it can also be planar.

The respective claw parts 11n extend outward from the base part 11g between two adjacent beam parts 11i within the opening 11j and are designed to abut on a case 15 in an elastically deformable manner. For sake of easier understanding, only one claw part 11n is denoted with reference numbers of respective parts, and other claw parts are not denoted with the reference numbers.

If the width of each claw part 11n is denoted as w1, the maximum width of each beam part 11i is denoted as w2, and a distance between an outer circumference of the respective base parts 11g and an outer circumference of the circular opening 11h is denoted as w3, they are approximately the same. What is meant by "approximately the same" is that values w1, w2 and w3 all fall within ±20% of the average value, and more preferably, within ±10% of the average value. Further, a distance A between a tip (abutment part 11q) of each claw part 11n and a base RT of each beam part 11i is set greater than the maximum width w2 of each beam part 11i and the width w1 of each claw part 11n.

Assembly of Pulsation Damper

Figure 4:
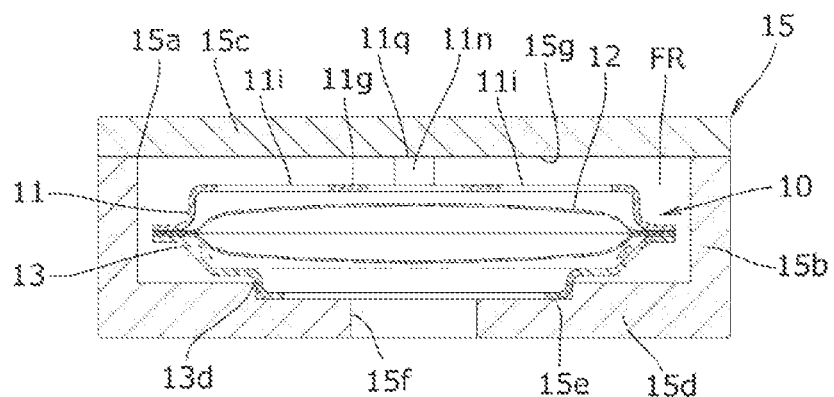
FIG. 4 is a cross-sectional view illustrating the pulsation damper 10 in a state assembled to a case 15.

FIG. 4 is a cross-sectional view illustrating the pulsation damper 10 in a state assembled to the case 15. In FIG. 4, the case 15 includes a bottomed cylindrical member 15b having an upper end 15a opened, and a lid member 15c having a disk shape and covering the upper end 15a of the bottomed cylindrical member 15b. A circular recessed portion 15e is formed on a bottom wall 15d of the bottomed cylindrical member 15b, and a circular opening 15f is formed within the recessed portion 15e. The opening 15f is communicated with a pressurizing chamber not shown. By assembling the bottomed cylindrical member 15b and the lid member 15c, the case 15 forming a part of a fuel pump is formed, for example.

During assembly, as illustrated in FIG. 2, the diaphragm damper 12 is disposed between the first support member 11 and the second support member 13, and the flange parts 11a, 12c and 13a are welded together to form the pulsation damper 10 illustrated in FIG. 1. The flange parts 11a, 12c and 13a are not necessarily welded together, and the diaphragm damper 12 may simply be nipped between the first support member 11 and the second support member 13.

Further, in a state where the lid member 15c is removed from the bottomed cylindrical member 15b, as illustrated in FIG. 4, the pulsation damper 10 is disposed in the case 15 such that the short cylindrical part 13d of the second support member 13 fits to the recessed portion 15e of the bottomed cylindrical member 15b. Thereafter, the lid member 15c is attached to the bottomed cylindrical member 15b and sealing is performed by welding, bolt or the like, by which the case 15 capable of accommodating fuel is formed, with a fuel chamber FR defined therein.

In this state, the abutment parts 11q of the respective claw parts 11n provided on the bridge parts 11f of the first support member 11 abut on a lower surface 15g of the lid member 15c, so that at first, the respective claw parts 11n are elastically deformed, and the base part 11g is pressed down thereby and sunk by which the respective beam parts 11i are elastically deformed, the elastic force urging the pulsation damper 10 downwardly and retaining the same in the case 15. That is, since both the respective claw parts 11n and the respective beam parts 11i serve as spring, the pulsation damper 10 is retained stably in the case 15. In this state, the fuel chamber FR and a pressurizing chamber not shown are communicated via the opening 15f, and the fuel in the fuel chamber FR comes into contact with the diaphragm damper 12 via the openings 11j and 13e and the small openings 13b, by which a pulsation reducing effect of the pulsation damper 10 during fuel pump operation is exerted.

According to the present embodiment, even if the diameter of the first support member 11 is relatively small, a sufficient length of the respective claw parts 11n and the respective beam parts 11i can be ensured, so that stress is dispersed and a favorable elastic property can be achieved. Especially, by setting the maximum width w2 of the respective beam parts 11i and the width w1 of the respective claw parts 11n to be smaller than the distance A between the tip (abutment part 11q) of each claw part 11n and the base RT of the respective beam parts 11i, a favorable elastic property of the respective beam parts 11i and the respective the claw parts 11n can be achieved. By setting the width w1 of the respective claw parts 11n, the maximum width w2 at the neck 11k of the respective beam parts 11i and the distance w3 between the outer circumference of the base part 11g and the outer circumference of the round opening 11h to be approximately equal, they can be assumed as being connected and virtually constituting a single leaf spring having a substantial width, so that the elastic modulus can be designed easily. In addition, an elastic property that is suitable for the diameter of the first support member 11 can be applied to the bridge part 11f by adjusting the shape of the neck 11k of the respective beam parts 11i. The respective beam parts 11i can be extended radially from the base part 11g as described above, or alternatively, can be extended diagonally.

First Modified Example

Figure 3:
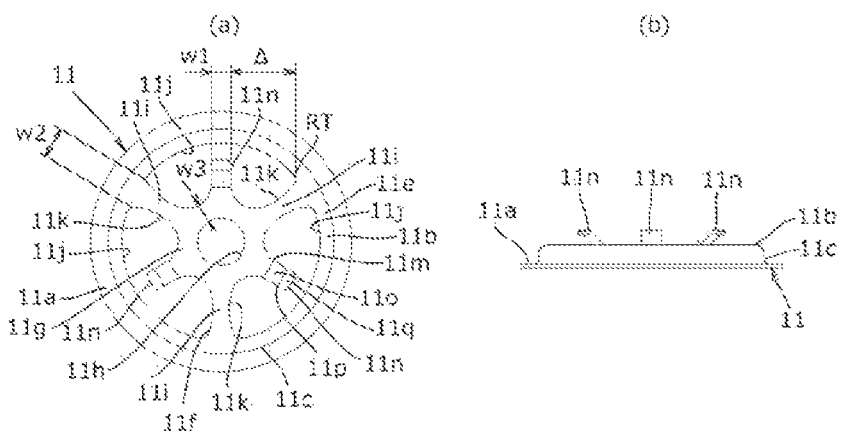
FIG. 3(a) is a top view of a first support member 11.
FIG. 3(b) is a side view of the first support member 11.
Figure 5:
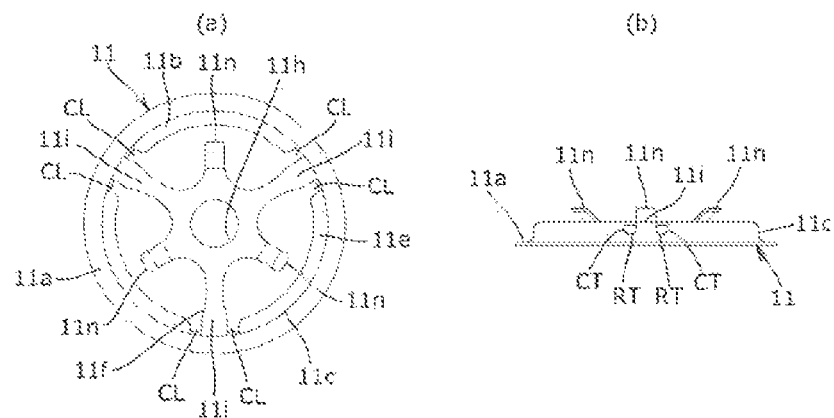
FIG. 5 is a view similar to FIG. 3, illustrating a first support member according to a first modified example.

FIG. 5 is a view similar to FIG. 3 illustrating a first support member according to a first modified example. According to the present modified example, the respective beam parts 11i are extended from the cylindrical part 11c. Specifically, as illustrated in FIG. 5(a), a clearance CL is formed between the annular part 11e and respective beam parts 11i, and as illustrated in FIG. 5(b), a cutout CT is formed to the cylindrical part 11c so as to contact the base RT of the respective beam parts 11i. The distance between the tip of the respective claw parts 11n and the respective beam parts 11i is greater than the aforementioned embodiment. Thereby, even in a case where the first support member 11 is downsized further, a sufficient length of the respective beam parts 11i is ensured to realize a favorable elastic property. Other configurations are similar to the aforementioned embodiment, so that components are denoted with the same reference numbers and detailed descriptions thereof are omitted.

Second Modified Example

Figure 6:
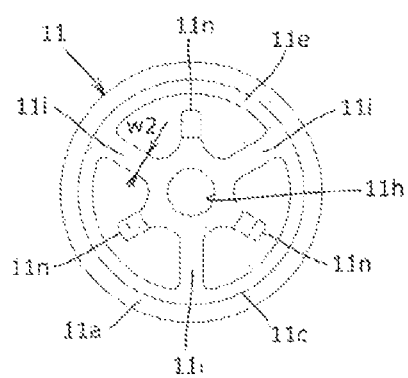
FIG. 6 is a view similar to FIG. 3(a), illustrating a first support member according to a second modified example.

FIG. 6 is a view similar to FIG. 3(a), illustrating a first support member according to a second modified example. In the present modified example, there are no necks formed on the beam parts 11i, and the beam parts 11i have a same width w2. Further, the width w2 of the respective beam parts 11i should preferably set equal to width w1 of the respective claw parts 11n. Other configurations are similar to the aforementioned embodiment, so that components are denoted with the same reference numbers and detailed descriptions thereof are omitted.

Second Embodiment

Figure 7:
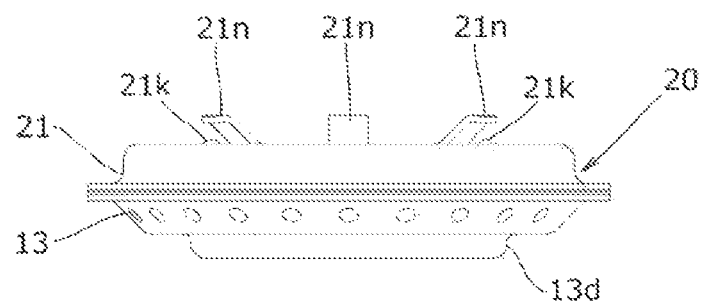
FIG. 7 is a side view of a pulsation damper 20 according to a second embodiment of the present invention.
Figure 8:
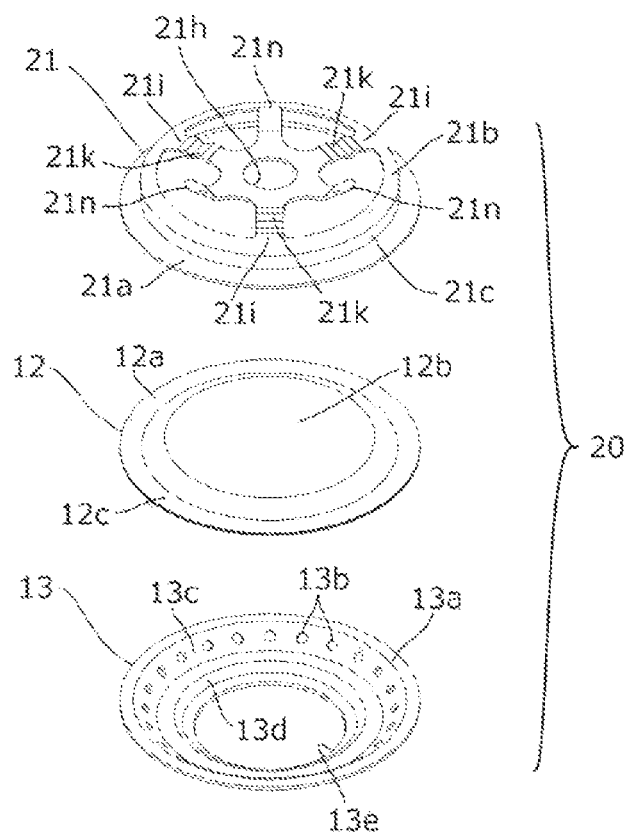
FIG. 8 is an exploded view of the pulsation damper 20.

FIG. 7 is a side view of a pulsation damper 20 according to a second embodiment of the present invention. FIG. 8 is an exploded view of the pulsation damper 20.

As illustrated in FIG. 8, the pulsation damper 20 is composed of a first support member 21, a diaphragm damper 12 and a second support member 13. The diaphragm damper 12 and the second support member 13 are similar to the aforementioned embodiment, so that the respective parts are denoted with the same reference numbers and detailed descriptions thereof are omitted.

Figure 9:
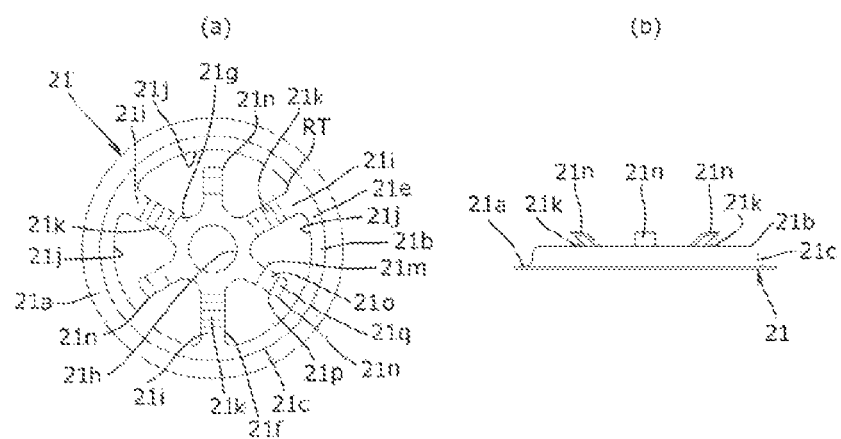
FIG. 9(a) is a top view of a first support member 21.
FIG. 9(b) is a side view of the first support member 21.

FIG. 9(a) is a top view of the first support member 21, and FIG. 9(b) is a side view of the first support member 21.

The first support member 21 formed in a circular shape by press-working a sheet metal includes an annular flange part 21a, a circular center part 21b that is shifted from the flange part 21a, and a cylindrical part 21c that connects the flange part 21a and the center part 21b.

The center part 21b includes an annular part 21e connected to the cylindrical part 21c, and a Y-shaped bridge part 21f connected to the annular part 21e. A base part 21g having an approximately hexagonal shape is provided at a center of the bridge part 21f, and a circular opening 21h is formed at a center of the base part 21g. The bridge part 21f is composed of three beam parts 21i connected radially to the base part 21g. Further, three approximately fan-shaped openings 21j are formed in a manner each surrounded by the annular part 21e and two adjacent beam parts 21i of the bridge part 21f.

The respective beam parts 21i have the same shape, and each beam part 21i includes a ridge-trough-shaped part 21k that forms a bellows shape by being bent periodically at the center. When a load is applied during assembly of the pulsation damper 20, the respective beam parts 21i will be easily deflected by providing the ridge-trough-shaped part 21k at the center part of each beam part 21i. Further, the elastic modulus of the respective bridge parts 21f can be adjusted easily by changing the number of the ridge-trough-shaped part 21k. The shape of the ridge-trough-shaped parts 21k is not necessary a bellows, and it can be a shape where one side is flat and the other side has concave-convex.

In the openings 21j, three claw parts 21n are formed to rise radially outward from the base part 21g respectively at intermediate positions between two adjacent beam parts 21i. Each claw part 21n includes a rising part 21o that is bent so as to rise from the base part 21g at a bend line 21m serving as border, and an abutment part 21q having an approximately trapezoidal shape and connected to the rising part 21o via a bend line 21p serving as border. The respective abutment parts 21q constitute a part of a cylindrical surface in this embodiment, but it can alternately be planar. For sake of easier understanding, only one claw part 21n is denoted with reference numbers of respective parts, and other claw parts are not denoted with the reference numbers.

Also according to the present embodiment, the distance between the tip (abutment part 21q) of the respective claw parts 21n and the base RT of the respective beam parts 21i is greater than the maximum width of each beam part 21i and the width of each claw part 21n. The beam parts 21i have an even width according to the present embodiment, but alternately, the beam parts 21i may have a neck formed locally thereto.

Assembly of Pulsation Damper

The assembly of the pulsation damper 20 is similar to the aforementioned embodiment, so the description thereof will be omitted.

Figure 10:
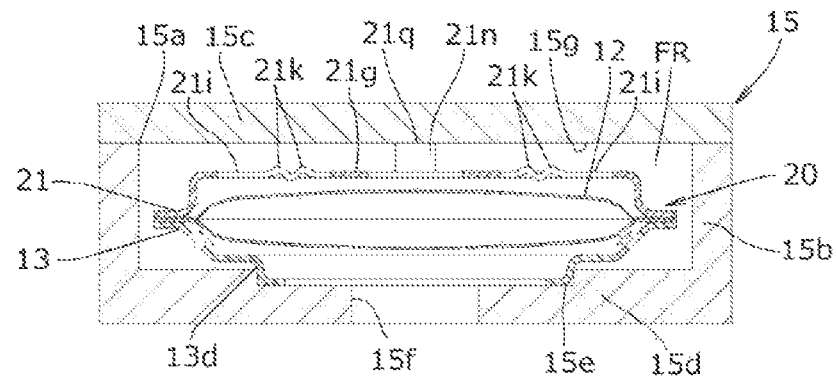
FIG. 10 is a cross-sectional view illustrating the pulsation damper 20 in a state assembled to the case 15.

FIG. 10 is a cross-sectional view illustrating the pulsation damper 20 in a state assembled to the case 15. The case 15 is also similar to that of the aforementioned embodiment, so the components of FIG. 10 are denoted with the same reference numbers, and detailed descriptions thereof will be omitted.

In FIG. 10, the pulsation damper 20 assembled as illustrated in FIG. 7 is disposed in the case 15 in a state where the lid member 15c is removed from the bottomed cylindrical member 15b, such that the short cylindrical part 13d of the second support member 13 fits to the recessed portion 15e of the bottomed cylindrical member 15b. Thereafter, the lid member 15c is attached to the bottomed cylindrical member 15b and sealing is performed by welding, bolt or the like, by which the case 15 capable of accommodating fuel is formed.

In this state, the abutment parts 21q of the respective claw parts 21n provided on the bridge parts 21f of the first support member 21 abut on the lower surface 15g of the lid member 15c, so that at first, the respective claw parts 21n are elastically deformed, and the base part 21g is pressed down thereby and sunk, by which the respective beam parts 21i are elastically deformed, the elastic force urging the pulsation damper 20 downwardly and retaining the same in the case 15. That is, since both the respective claw parts 21n and the respective beam parts 21i serve as spring, the pulsation damper 20 is retained stably in the case 15. In this state, the fuel chamber FR and a pressurizing chamber not shown are communicated via the opening 15f, and the fuel in the fuel chamber FR comes into contact with the diaphragm damper 12 via the opening portions 11j and 13e and the small openings 13b, by which a pulsation reducing effect of the pulsation damper 20 during fuel pump operation is exerted.

According to the present embodiment, even if the diameter of the first support member 21 is relatively small, a sufficient length of the respective claw parts 21n can be ensured by providing the ridge-trough-shaped part 21k, so that stress is dispersed and a favorable elastic property can be achieved. In addition, an elastic property that is suitable for the diameter of the first support member 21 can be applied to the bridge part 21f by adjusting the number of ridges and troughs of the ridge-trough-shaped part 21.

Third Embodiment

Figure 11:
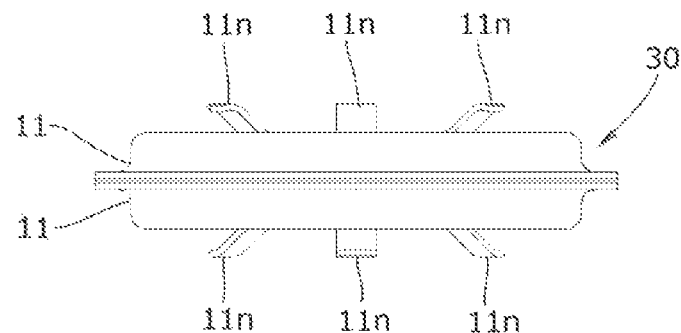
FIG. 11 is a side view of a pulsation damper 30 according to a third embodiment of the present invention.

FIG. 11 is a side view of the pulsation damper 30 according to a third embodiment of the present invention. Compared to the first embodiment, the pulsation damper 30 according to the present embodiment nips the diaphragm damper 12 (refer to FIG. 2) by a pair of first support members 11 from top and bottom. In other words, a second support member is not included.

Figure 12:
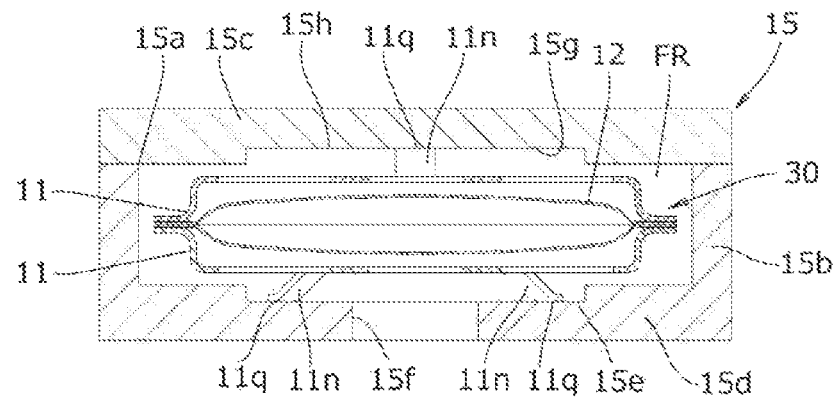
FIG. 12 is a cross-sectional view illustrating the pulsation damper 30 in a state assembled to the case 15.

FIG. 12 is a cross-sectional view illustrating the pulsation damper 30 in a state assembled to the case 15. The case 15 according to the present embodiment differs from the aforementioned embodiment only in that a recessed portion 15h is formed to the lower surface 15g of the lid member 15c in a manner opposed to the recessed portion 15e formed to the bottom wall 15d of the bottomed cylindrical member 15b, so that the same components are denoted with the same reference numbers, and detailed descriptions thereof are omitted.

Assembly of Pulsation Damper

In FIG. 12, the pulsation damper 30 assembled as illustrated in FIG. 11 is disposed in the case 15 in a state where the lid member 15c is removed from the bottomed cylindrical member 15b, such that the abutment part 11q of the respective claw parts 11n of the lower first support member 11 abuts on the recessed portion 15e of the bottomed cylindrical member 15b. Thereafter, the lid member 15c is attached to the bottomed cylindrical member 15b and sealing is performed by welding, bolt or the like, by which the case 15 capable of accommodating fuel is formed.

In this state, the abutment parts 11q of the respective claw parts 11n provided on the upper first support member 11 abut on the bottom of the recessed portion 15h of the lid member 15c. Thereby, the respective claw parts 11n on the upper and lower first support members 11 are elastically deformed, and the elastic force urges the pulsation damper 30 downwardly and retains the same in the case 15. That is, since both the respective claw parts 11n and the respective beam parts 11i serve as spring, the pulsation damper 30 is retained stably in the case 15. According to the present embodiment, there is no need to consider the upper and lower sides when assembling the pulsation damper 30 to the case 15, so that assembling can be facilitated, and erroneous assembly can be prevented. Since two common first support members are used instead of using the second support member, the types of components can be reduced and costs can be cut down. The first support member 11 according to the first embodiment has been used to form the pulsation damper 30, but other members can also be used as the first support member.

Fourth Embodiment

Figure 13:
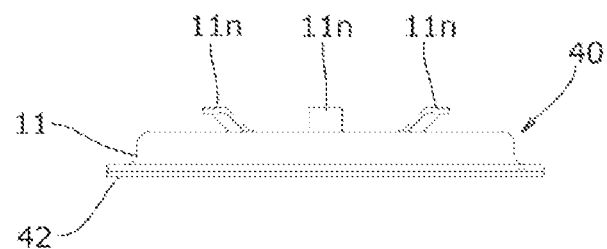
FIG. 13 is a side view of a pulsation damper 40 according to a fourth embodiment of the present invention.
Figure 14:
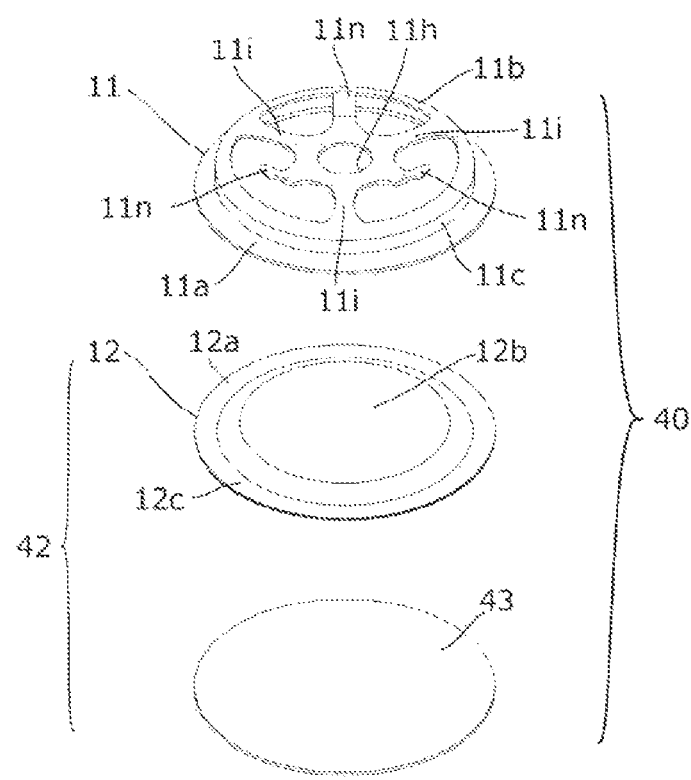
FIG. 14 is an exploded view of the pulsation damper 40.

FIG. 13 is a side view of a pulsation damper 40 according to a fourth embodiment of the present invention. FIG. 14 is an exploded view of the pulsation damper 40.

As illustrated in FIG. 14, the pulsation damper 40 is composed of a first support member 11 and a diaphragm damper 42. The diaphragm damper 42 is formed by welding a flange part 12c of a plate member 12a described earlier to one side of a flat circular plate 43. The plate member 12a is similar to that of the aforementioned embodiment, so that descriptions thereof are omitted. The first support member 11 is also similar to that of the aforementioned embodiment, so that respective components are denoted with the same reference numbers, and detailed descriptions thereof are omitted.

Assembly of Pulsation Damper

During assembly, as illustrated in FIG. 14, the circular projected part 12b of the plate member 12a is disposed on the side of the first support member 11, and the flange parts 11a and 12c (and the circular plate 43) are welded together to form the pulsation damper 40 illustrated in FIG. 13.

Figure 15:
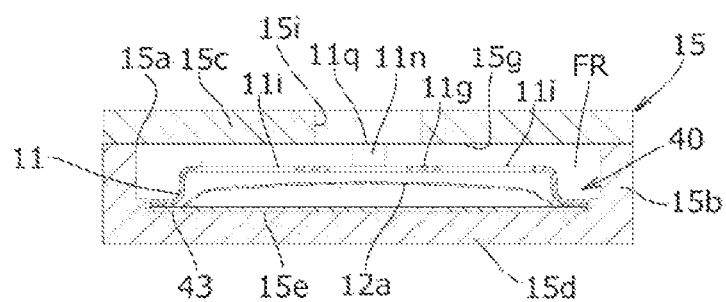
FIG. 15 is a cross-sectional view of the pulsation damper 40 in a state assembled to the case 15.

FIG. 15 is a cross-sectional view of the pulsation damper 40 in a state assembled to the case 15. The case 15 according to the present embodiment differs from the aforementioned embodiment only in that an opening 15i is formed at a center of a lower surface 15g of a lid member 15c instead of forming an opening on the bottom wall 15d of the bottomed cylindrical member 15b, so that the same components are denoted with the same reference numbers, and detailed descriptions thereof are omitted. The opening 15i is similarly communicated with a pressurizing chamber not shown.

In FIG. 15, the pulsation damper 40 assembled as illustrated in FIG. 13 is disposed in the case 15 with the circular plate 43 closely attached to the recessed portion 15e of the bottomed cylindrical member 15b in a state where the lid member 15c is removed from the bottomed cylindrical member 15b. Thereafter, the lid member 15c is attached to the bottomed cylindrical member 15b and sealing is performed by welding, bolt or the like, by which the case 15 capable of accommodating fuel is formed.

In this state, the abutment parts 11q of the respective claw parts 11n provided on the bridge parts 11f of the first support member 11 abut on the lower surface 15g of the lid member 15c surrounding the opening 15i, so that at first, the respective claw parts 11n are elastically deformed, and the base part 11g is pressed down thereby and sunk, by which the respective beam parts 11i are elastically deformed, the elastic force urging the pulsation damper 40 downwardly and retaining the same in the case 15. That is, since both the respective claw parts 11n and the respective beam parts 11i serve as spring, the pulsation damper 40 is retained stably in the case 15. In this state, the fuel chamber FR and a pressurizing chamber not shown are communicated via the opening 15f, and the fuel in the fuel chamber FR comes into contact with the diaphragm damper 42 via the opening portions 11j and 13e and the small openings 13b, by which a pulsation reducing effect of the pulsation damper 40 during fuel pump operation is exerted.

According to the present embodiment, the number of components can be reduced compared to the aforementioned embodiment. The pulsation damper 40 adopts the first support member 11 according to the first embodiment, but other types of first support member can also be used.

In the aforementioned embodiment, three claw parts and three beam parts are disposed, but the number of the respective parts can be two, or four or more.

REFERENCE SIGNS LIST 10, 20, 30, 40 pulsation damper
11, 21 first support member
11a, 21a flange part
11c, 21c cylindrical part
11e, 21e annular part
11f, 21f bridge part
11i, 21i beam part
11n, 21n claw part
11k neck
21k ridge-trough shaped part
12, 42 diaphragm damper
13 second support member
15 case
43 circular plate

The invention claimed is:

1. A pulsation damper accommodated in a case, the pulsation damper comprising: a diaphragm damper having a gas sealed therein; and a support member that is disposed between the case and the diaphragm damper and that holds the diaphragm damper, wherein the support member comprises an annular holding part that is provided on a peripheral edge portion thereof and that holds a peripheral edge of the diaphragm damper, a base part provided on a center part thereof, a plurality of elastically deformable beam parts that are defined by a plurality of opening portions formed in an annularly aligned manner around the base part between the holding part and the base part, each of the plurality of beam parts held by the holding part at one end and held by the base part at the other end, and a plurality of claw parts defined by the plurality of openings, the plurality of claw parts that abut on the case in an elastically deformable manner, each of the plurality of claw parts provided to extend outward from the base part between two adjacent beam parts, wherein each of the plurality of claw parts is arranged on an opposite side of the base part from a respective one of the plurality of beam parts, wherein the plurality of claw parts and the plurality of beam parts are alternatingly arranged around a circumference of the base part, and a distance between a free end of each of the plurality of claw parts and a base of an adjacent one of the plurality of beam parts connected to the holding part is greater than a maximum width of each of the plurality of beam parts.

2. The pulsation damper according to claim 1, wherein a width of the plurality of beam parts and a width of the plurality of claw parts are respectively approximately the same.

3. The pulsation damper according to claim 1, wherein the plurality of beam parts comprises a neck provided at least at a portion thereof.

4. The pulsation damper according to claim 1, wherein the plurality of beam parts comprises a ridge-trough shape at least at a portion thereof.

5. The pulsation damper according to claim 4, wherein the plurality of beam parts comprises a bellows shape.

6. The pulsation damper according to claim 1, wherein the holding part is composed of an annular part and a cylindrical part connected to the annular part, wherein the plurality of beam parts respectively extend from the cylindrical part, and wherein a cutout is formed to the cylindrical part so as to contact each of a base of the plurality of beam parts.

7. The pulsation damper according to claim 1, wherein the support member is disposed to cover one side of the diaphragm damper.

8. The pulsation damper according to claim 1, wherein the support member is disposed on both sides of the diaphragm damper.

9. The pulsation damper according to claim 1, wherein the each of the plurality of claw parts and the respective one of the plurality of beam parts are provided radially from the base part as a center.

10. The pulsation damper according to claim 1, wherein the base part having a hole therethrough, and a portion of the base part between an outer circumference of the hole and an outer circumference of the base part forms a leaf spring with the beam parts and the claw parts.

11. The pulsation damper according to claim 1, wherein the plurality of claw parts and the plurality of beam parts are alternatingly arranged around a circumference of the base part, and
each of a width of each of the plurality of claw parts and a maximum width of each of the plurality of beam parts are within ±20% of an average value.

12. The pulsation damper according to claim 1, wherein a number of the plurality of claw parts, a number of the plurality of beam parts, and a number of the opening parts are equal.

13. The pulsation damper according to claim 1, wherein each of the plurality of claw parts is disposed at an opposing position of an opposed beam part of the plurality of beam parts across the base part, the opposed beam part being aligned with the each of the plurality of claw parts.

14. The pulsation damper according to claim 1, wherein each of the plurality of beam parts is defined between adjacent opening portions of the plurality of opening portions, and
each of the plurality of opening portions defines a respective one of the plurality of claw parts.

* * * * *